United States Patent
Hakala et al.

(10) Patent No.: US 8,090,652 B2
(45) Date of Patent: Jan. 3, 2012

(54) SYSTEM AND METHOD FOR CHARGING IN A COMMUNICATIONS NETWORK AND A COMMUNICATIONS NETWORK CHARGING SERVER

(75) Inventors: Harri Hakala, Turku (FI); Matti Halkosaari, Turku (FI); Robert Törnkvist, Karlshamn (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1926 days.

(21) Appl. No.: 10/492,045

(22) PCT Filed: Oct. 8, 2002

(86) PCT No.: PCT/SE02/01840
§ 371 (c)(1),
(2), (4) Date: Apr. 7, 2004

(87) PCT Pub. No.: WO03/032657
PCT Pub. Date: Apr. 17, 2003

(65) Prior Publication Data
US 2004/0247100 A1    Dec. 9, 2004

(30) Foreign Application Priority Data

Oct. 8, 2001  (FI) .................................. 20011955
Oct. 18, 2001  (FI) .................................. 20012023

(51) Int. Cl.
*G06Q 40/00*  (2006.01)
(52) U.S. Cl. ............. 705/40; 705/35; 455/406; 455/407
(58) Field of Classification Search .............. 705/35–45; 455/406–408
See application file for complete search history.

(56) References Cited

U.S. PATENT DOCUMENTS 5,265,155 A * 11/1993 Castro ........................ 379/114.2
5,303,297 A *  4/1994 Hillis ............................ 455/406
5,450,477 A *  9/1995 Amarant et al. ......... 379/114.17
(Continued)

FOREIGN PATENT DOCUMENTS

GB     2372405     8/2002
(Continued)

OTHER PUBLICATIONS

Internet-Draft, Diameter Credit Control Application, Harri Hakala, Ericsson, Aug. 2003, pp. 1-39, www.watersprings.org.

*Primary Examiner* — Shahid Merchant
*Assistant Examiner* — Stephanie M Ziegle

(57) ABSTRACT

The present invention relates to a system and a method for charging in a communication network and to a communication network charging server. The system comprises a client (1) associated with the network for providing services to subscribers associated with the network. The charging server (2) is adapted to handle subscriber account information, and the said client (1) is adapted to send a first charging request message for a service, to the charging server (2) before the service is provided, using an on-line charging protocol (3). The charging server (2) is also adapted to perform pre-reservation of an amount of resources from the subscriber's account, wherein the amount depends on a requested amount included in the message about the service, and to return an answer message including information indicating whether an amount of resources is pre-reserved from said subscriber account for enabling usage of the service to the client (1) using the on-line charging protocol (3).

38 Claims, 7 Drawing Sheets

U.S. PATENT DOCUMENTS

| | | | | |
|---|---|---|---|---|
| 5,559,871 | A * | 9/1996 | Smith | 379/115.01 |
| 5,812,945 | A * | 9/1998 | Hansen et al. | 455/403 |
| 5,995,822 | A * | 11/1999 | Smith et al. | 455/406 |
| 6,047,051 | A * | 4/2000 | Ginzboorg et al. | 379/130 |
| 6,058,173 | A * | 5/2000 | Penfield et al. | 379/114.17 |
| 6,058,303 | A * | 5/2000 | Astrom et al. | 455/413 |
| 6,188,752 | B1 * | 2/2001 | Lesley | 379/114.16 |
| 6,480,591 | B1 * | 11/2002 | Penfield et al. | 379/144.01 |
| 6,615,034 | B1 * | 9/2003 | Alloune et al. | 455/406 |
| 6,661,887 | B1 * | 12/2003 | Wallenius | 379/219 |
| 6,665,387 | B2 * | 12/2003 | Hannu | 379/114.16 |
| 6,704,563 | B1 * | 3/2004 | Senn et al. | 455/406 |
| 6,952,575 | B1 * | 10/2005 | Countryman et al. | 455/408 |
| 6,999,943 | B1 * | 2/2006 | Johnson et al. | 705/39 |
| 7,486,945 | B2 * | 2/2009 | Senn et al. | 455/406 |
| 2001/0021647 | A1 | 9/2001 | Kondo et al. | |
| 2001/0048686 | A1 * | 12/2001 | Takeda et al. | 370/401 |
| 2002/0016748 | A1 * | 2/2002 | Emodi et al. | 705/26 |
| 2002/0085694 | A1 * | 7/2002 | Ruckart | 379/121.02 |
| 2002/0169883 | A1 * | 11/2002 | Bright et al. | 709/230 |

FOREIGN PATENT DOCUMENTS

| | | |
|---|---|---|
| WO | WO 9859504 | 12/1998 |
| WO | WO 0005871 | 2/2000 |
| WO | WO 02067156 | 8/2002 |

* cited by examiner

SYSTEM AND METHOD FOR CHARGING IN A COMMUNICATIONS NETWORK AND A COMMUNICATIONS NETWORK CHARGING SERVER

TECHNICAL FIELD OF THE INVENTION

The present invention relates in general to communication networks and more specifically to a system and a method for charging in a communication network and to a communication network charging server.

BACKGROUND OF THE INVENTION

In the present communication networks i.e. telecommunications networks and data communications networks there are no real-time charging protocol mechanisms over which a client providing services to the subscriber would be able to debit subscriber's account residing in a charging server based on the charges calculated by the client.

The current real-time charging protocol mechanisms do not allow any client to request charging server to rate a service event(s) and return the number of the events that are allowed be provided to the subscriber.

Furthermore, the current real-time charging protocol mechanisms do not allow any client to inform the sub-scriber before and after Service Event execution about the monetary amount to be used.

The new network generation specifies (e.g. 3G Charging and Billing requirements) the more critical requirements for the Accounting applications (Charging systems) of the communication networks. The Accounting application must be able to rate Accounting information in real-time. For example, the service environment processes service event information, which has to be rated before or at service delivery/execution.

There exist also requirements for the End User credit control of the new communication networks generation. The Accounting application must be able to check the End User's account for coverage for the requested Service Event charges prior to execution of that Service Event. All the chargeable events related to a specific account must be barred to the End User when the credit of that account is exhausted or expired.

In the next generation networks the number of services offered to the End User and the number of actors delivering these services to End Users will grow. To fulfil all these new requirements new types of mechanisms for charging in a data communication network are needed, which will support the communication between Credit Control applications/servers and the service environment.

A particular problem arises in connection with intelligent network (IN) services, such as Premium Rate calls, Mobile Virtual Private Network (VPN), Prepaid charging and Personal Number. Since prepaid usually is an IN service itself it is not convenient to provide prepaid of other IN services for subscribers. To provide prepaid of other IN services, the prepaid functionality has been integrated with the particular other IN service in prior art communications system. Hence, each IN service has to be redesigned with prepaid functionality added to be able to offer the service as prepaid.

SUMMARY OF THE PRESENT INVENTION

It is an object of the present invention to overcome or at least mitigate the disadvantages of the prior art. The present invention provides a system and a method for charging in a communication network and a communication network charging server.

According to a first aspect of the present invention there is provided a system for charging in a communications network, comprising a client associated with the network for providing services to subscribers associated with the network, wherein the system comprises a charging server adapted to handle subscriber account information, the client is adapted to send a first charging request message for a service, to the charging server before the service is provided, using an on-line charging protocol, the charging server is adapted to perform pre-reservation of an amount of resources from the subscriber's account defined by information included in said message about said service, and to return an answer message including information indicating whether enough resources are pre-reserved from said subscriber account for enabling usage of said service to the client using the on-line charging protocol.

According to a second aspect of the present invention there is provided a system for charging in a communications network, comprising a client associated with the network for providing services to subscribers associated with the network, wherein the system comprises a charging server adapted to handle subscriber account information, the client is adapted to send a first charging request message for a service, to the charging server before the service is provided, using an on-line charging protocol, and the charging server is adapted to rate the service and return an answer message to the client using an on-line charging protocol, wherein the answer message includes the price indications of the requested service event(s).

According to a third aspect of the present invention there is provided a method for charging in a communications network, comprising a client associated with the network for providing services to subscribers associated with the network and a charging server adapted to handle subscriber account information having the subscriber account information, wherein the client sends a first charging request message for a service, to the charging server before the service is provided, using an on-line charging protocol, the charging server performs pre-reservation of an amount of resources from the subscriber's account defined by information included in the message about the service, and returns an answer message including information indicating whether enough resources are pre-reserved from said subscriber account for enabling usage of the service to the client using the on-line charging protocol.

According to a fourth aspect of the present invention there is provided a method for charging in a communications network comprising a client associated with the network for providing services to subscribers associated with the network and a charging server adapted to handle subscriber account information having the subscriber account information, wherein the client sends a first charging request message for a service, to the charging server before the service is provided, using an on-line charging protocol, the charging server rates the service and returns an answer message to the client using an on-line charging protocol, wherein the answer message includes the price indications of the requested service event (s).

According to a fifth aspect of the present invention there is provided charging server for charging service usage in a communications network, wherein the charging server is adapted to handle subscriber account information, receive a first charging request message for a service from a client, before the service is provided, using an on-line charging protocol, perform pre-reservation of an amount of resources from the subscriber's account defined by information included in the message about the service, and to return an answer message including information indicating whether enough resources are pre-reserved from said subscriber account for enabling usage of said service to the client using the on-line charging protocol.

According to a sixth aspect of the present invention there is provided a charging server for charging service usage in a communications network, wherein the charging server is adapted to handle subscriber account information, receive a first charging request message for a service from a client, before the service is provided, using an on-line charging protocol, and rate the service and return an answer message to the client using an on-line charging protocol, wherein the answer message includes the price indications of the requested service event(s).

Advantages of the present invention are that any client network can debit end subscribers' account specified in the charging server, any client can use the charging server to rate service event(s) without knowledge about the actual price and the control how many such service events can be provided to the user, and the client can provide cost estimation to subscribers before service execution and a final cost for the service usage after the service execution. Still another advantage is that intelligent network (IN) services can be provided with prepaid rating without redesign of the complete IN service. Hence, each IN service does not need to be redesigned with prepaid functionality added to be able to offer the service as prepaid.

BRIEF DESCRIPTION OF THE DRAWINGS

For a better understanding of the present invention and in order to show how the same may be carried into effect reference will now be made to the accompanying drawings, in which.

DETAILED DESCRIPTION OF THE INVENTION

The solution according to the present invention presents a new mechanism for charging in a communication network. This new charging mechanism allows any client network to debit end subscriber's account specified in a new On-line Charging Server. The monetary amount to be debited is determined by the client.

In the new charging mechanism according to the present invention a client in the network can use the Charging Server to rate service event or service events without knowing the actual price and control how many such a service events can be provided to subscriber. In the new charging mechanism according to the present invention the client can further provide to subscriber cost estimation before service execution and final cost after service execution.

Figure 1:
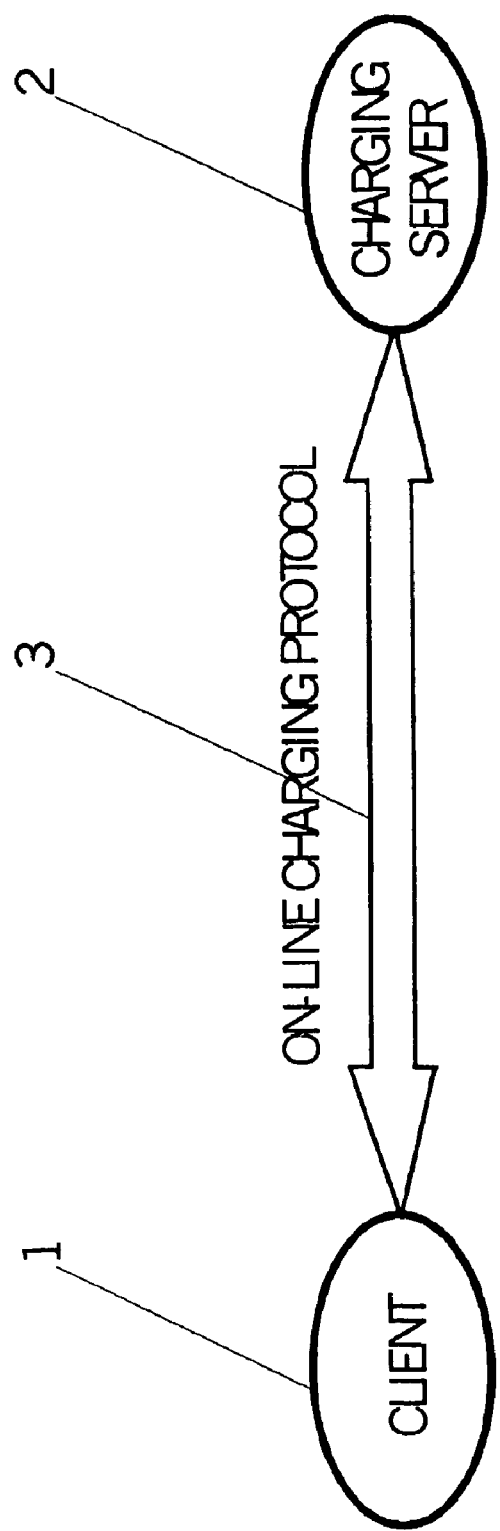
FIG. 1 illustrates the system for charging in a communication network-'according to the present invention.

FIG. 1 illustrates the system for charging in a communication network according to the present invention. In the charging system according to the present invention there is a client 1 providing services to the subscriber and a charging server or charging control server 2 having the subscriber account information. The client 1 and the charging server 2 communicate using an On-line Charging Protocol 3. The On-line Charging Protocol 3 is a bi-directional protocol that supports real-time charging. Real-time charging is charging which is performed as a part of rendering services. Preferably, the On-line Charging Protocol 3 is based on an IP protocol such as the Diameter protocol. Alternatively, the On-line Charging Protocol is based on Parlay protocol, INAP CS1 protocol or SS7.

Figure 2:
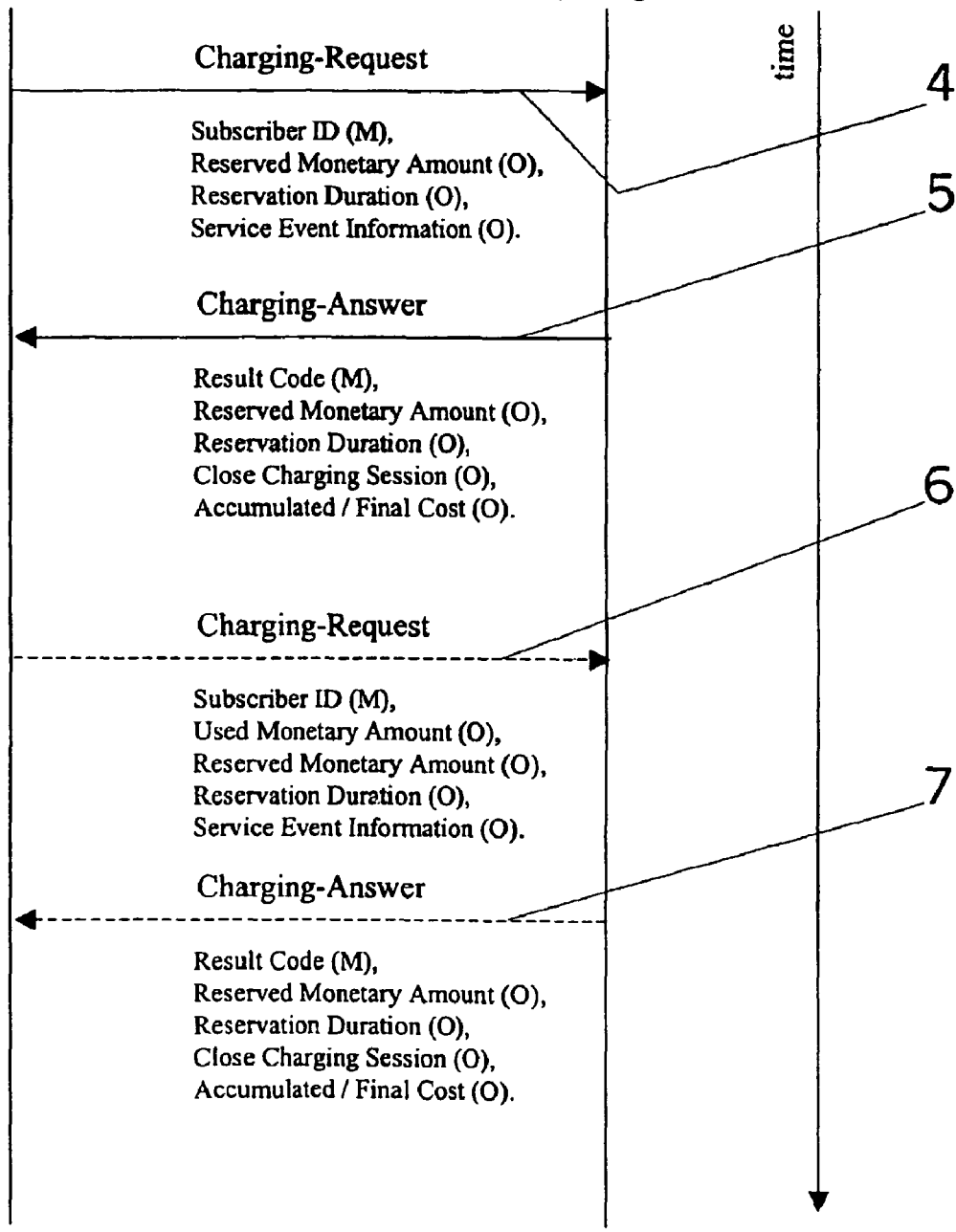
FIG. 2 illustrates the message sequence for account debiting by monetary units in the system for charging in a communication network according to the present invention.

FIG. 2 illustrates the message sequence for account debiting by monetary units in the system for charging in a communication network according to the present invention. The client may reserve money for a subscriber to use for services charging wise controlled by the client 1 by sending a Charging-Request 4 message to the charging server 2. An alternative Charging-Request message is marked with a reference number 6.

In the Charging-Request 4, 6 the subscriber to be charged for is identified by a specific Subscriber ID, for instance IMSI, MSISDN, IP address or SIP URL. The client 1 indicates how much money it wants to reserve for the use of services controlled by it (Reserved Monetary Amount). The client 1 can also indicate to the charging server 2 what is the expected duration during which the monetary amount is to be consumed (Reservation Duration). The charging server 2 uses the message parameters of Charging-Request 4, 6 to determine how it should response to the request 4, 6.

The charging server 2 then determines, even independent on the value requested by the client 1, the monetary amount to be reserved from subscriber's account. The amount can be for instance a default value independent from the requested value. For instance, the amount can be equal to the requested value in case there is enough money on the account. Likewise, the amount can be less than what is requested in case there is not enough money on the subscriber's account, or in case the subscriber is unreliable.

It can also be that the client 1 does not indicate a requested monetary amount in the Charging-Request 4, 6. In this case the charging server 2 needs to determine the monetary amount to be reserved based on other message parameters, such as the service used e.g. Service Event Information, such as time, data volume, service specific events (e.g. web-pages downloads, timetable inquires, etc) and money, of the Charging-Request 4, 6 or based on configuration parameters in the charging server 2. The charging server 2 returns the reserved monetary amount in a Charging-Answer 5 message to the client 1. An alternative Charging-Answer message is marked with a reference number 7.

The charging server 2 also determines the allowed duration to be used for the consuming of the reserved monetary amount. The duration can be a default value independent on the requested value. For instance, the duration can be bigger than the requested value in case of signalling capacity problems, or duration can be less than what is requested in case the subscriber is unreliable.

In case the client 1 does not indicate a requested Reservation Duration, then the charging server 2 needs to determine the duration to be reserved based on other message parameters of Charging-Request 4, 6 or based on configuration parameters in the charging server 2. The charging server 2 returns the reservation duration in a Charging-Answer 5, 7 message to the client 1.

The charging server 2 can also choose not to put any time limit on the usage of the monetary amount, in which case it does not send message parameter Reservation Duration. The charging server 2 can also indicate in the Charging-Answer 5, 7 message to the client 1 that the reservation was unsuccessful e.g. in case the subscriber's account is totally empty.

When the Charging-Answer 5, 7 indicates that a monetary amount is successfully reserved, then the client 1 allows the subscriber to initiate chargeable transactions in the client network. Upon the entire monetary amount reserved by the charging server 2 has been spent by the subscriber, the client 1 re-requests for more money from the charging server 2 by sending a new Charging-Request 6.

In case the monetary amount reserved by the charging server 2 is not spent upon the expiration of the reservation time allocated by the charging server 2, the client 1 contacts the charging server 2 with a new Charging-Request 6 indicating how much money was actually used by the subscriber (Used Monetary Amount). The new Charging-Request 6 message can also include a request for more money.

As the charging server 2 receives the knowledge on the money used by the subscriber, it returns the initially reserved monetary amount back to the account, and deducts the used monetary amount from the account. Thereafter, the charging server 2 starts reserving the next monetary amount from the account. If the knowledge on the money used by the subscriber is not received in the message, the charging server 2 deducts the account based on the reserved amount at the reception of previous Charging-Request 4, 6.

In case the initial reservation request 4 is unsuccessful, the client 1 will determine whether it wants to retry the reservation e.g. with smaller value for Reserved Monetary Units. The charging server 2 can give some input to the client 1 to determine what to do in the unsuccessful reservation case. The charging session between the client and the Charging Server can be finished by the client 1 according to the instructions from the charging server 2 (Close Charging Session).

The charging server 2 includes to each Charging-Answer 5, 7 the accumulated cost (Accumulated Cost) for charging session. The final answer message 5, 7 also includes the total cost of the charging session.

Figure 3:
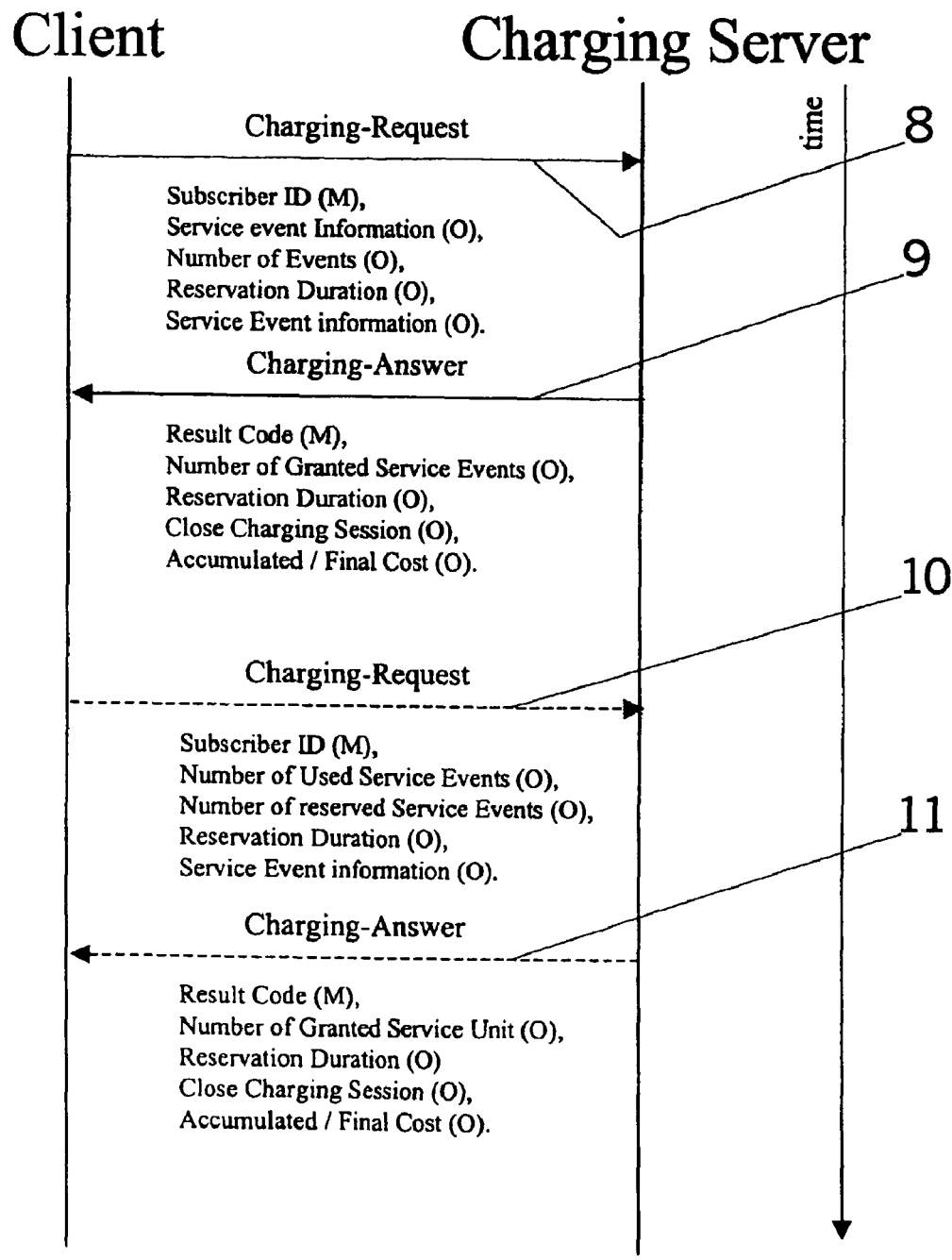
FIG. 3 illustrates the message sequence for rating service events in the system for charging in a communication network according to the present invention.

FIG. 3 illustrates the message sequence for rating service events in the system for charging in a communication network according to the present invention. The client 1 may request rates for service events and reserve money for a subscriber to use the service by sending a first Charging-Request 8 message to the charging server 2. An second Charging-Request message is marked with a reference number 10.

In the Charging-Request 8, 10 the subscriber to be charged for is identified by a specific Subscriber ID, for instance IMSI, MSISDN or SIP URL. The client 1 indicates the service event type (Service event Information) and number (Number of Events) of such events, which it wants to be rated. The client 1 can also indicate to the charging server 2 what is the expected duration during which the service events are to be consumed (Reservation Duration). The charging server 2 uses the message parameters of Charging-Request 8, 10 to determine how it should response to the request 8, 10.

The charging server 2 then rates the requested service using service event information and number of requested information, and reserves corresponding amount of money from the subscriber account.

The charging server 2 then determines, even independent on the requested number of events by the client 1, the number of events, which are granted to be used by the subscriber. The number of events can be for instance a default value independent from the requested value. For instance, the number of events can be equal to the requested value for instance in case there is enough money on the account. Likewise, the number of events can be less than what is requested in case there is not enough money on the subscriber's account, or in case the subscriber is unreliable.

The charging server 2 returns the number of events, which are granted to be used by the subscriber in a Charging-Answer 9 message to the client 1. An alternative Charging-Answer message is marked with a reference number 11.

The charging server 2 also determines the allowed duration to be used for the consuming of the reserved monetary amount. The duration can be a default value independent on the requested value. For instance, the duration can be bigger than the requested value in case of signalling capacity problems, or duration can be less than what is requested in case the subscriber is unreliable.

In case the client 1 does not indicate a requested Reservation Duration, then the charging server 2 needs to determine the duration to be reserved based on other message parameters e.g. Service Event Information of Charging-Request 8, 10 or based on configuration parameters in the charging server 2. The charging server 2 returns the reservation duration in a Charging-Answer 9, 11 message to the client 1.

Alternatively, the Charging Server does not put any duration limit on the usage of the granted number events, in which case it does not send message parameter Reservation Duration.

The charging server 2 can also choose not to put any limit on the usage of the granted number events, in which case it does not send message parameter Reservation Duration. The charging server 2 can also indicate in the Charging-Answer 9, 11 message to the client 1 that the reservation was unsuccessful e.g. in case the subscriber's account is totally empty.

When the Charging-Answer 9, 11 indicates that rating of the service event and reservation of a monetary amount is successful, then the client 1 allows the subscriber to initiate chargeable transactions in the client network. Upon the all granted events reserved by the charging server 2 have been spent by the subscriber, the client 1 re-requests for more service events from the charging server 2 by sending a new Charging-Request 8, 10.

In case the granted number of events reserved by the charging server 2 is nbt spent upon the expiration of the reservation time allocated by the charging server 2, the client 1 contacts the charging server 2 with a new Charging-Request 10 indicating how many events was actually used by the subscriber (Number of Used Service Events). The new Charging-Request 10 message can also include a request for more events.

As the charging server 2 receives the knowledge on the service events used by the subscriber, it returns the initially reserved monetary amount back to the account, i.e cancels the reservation, and deducts a monetary amount equal to the number of used service events from the account. Thereafter, the charging server 2 rates the new service event request and starts reserving the corresponding amount from the account. If the knowledge on the service events used by the subscriber is not received in the message, the charging server 2 deducts the account based on the already reserved amount.

In case the initial reservation request 8, is unsuccessful, the client 1 will determine whether it wants to retry the reservation e.g. with less number of events. The charging server 2 can give some input to the client 1 to determine what to do in the unsuccessful reservation case. The charging session between the client and the Charging Server can be finished by the client 1 according to the instructions from the charging server 2 (Close Charging Session).

The charging server 2 includes to each Charging-Answer 9, 11 the accumulated cost (Accumulated Cost) for charging session. The final answer message 9, 11 also includes the total cost of the charging session.

Figure 4:
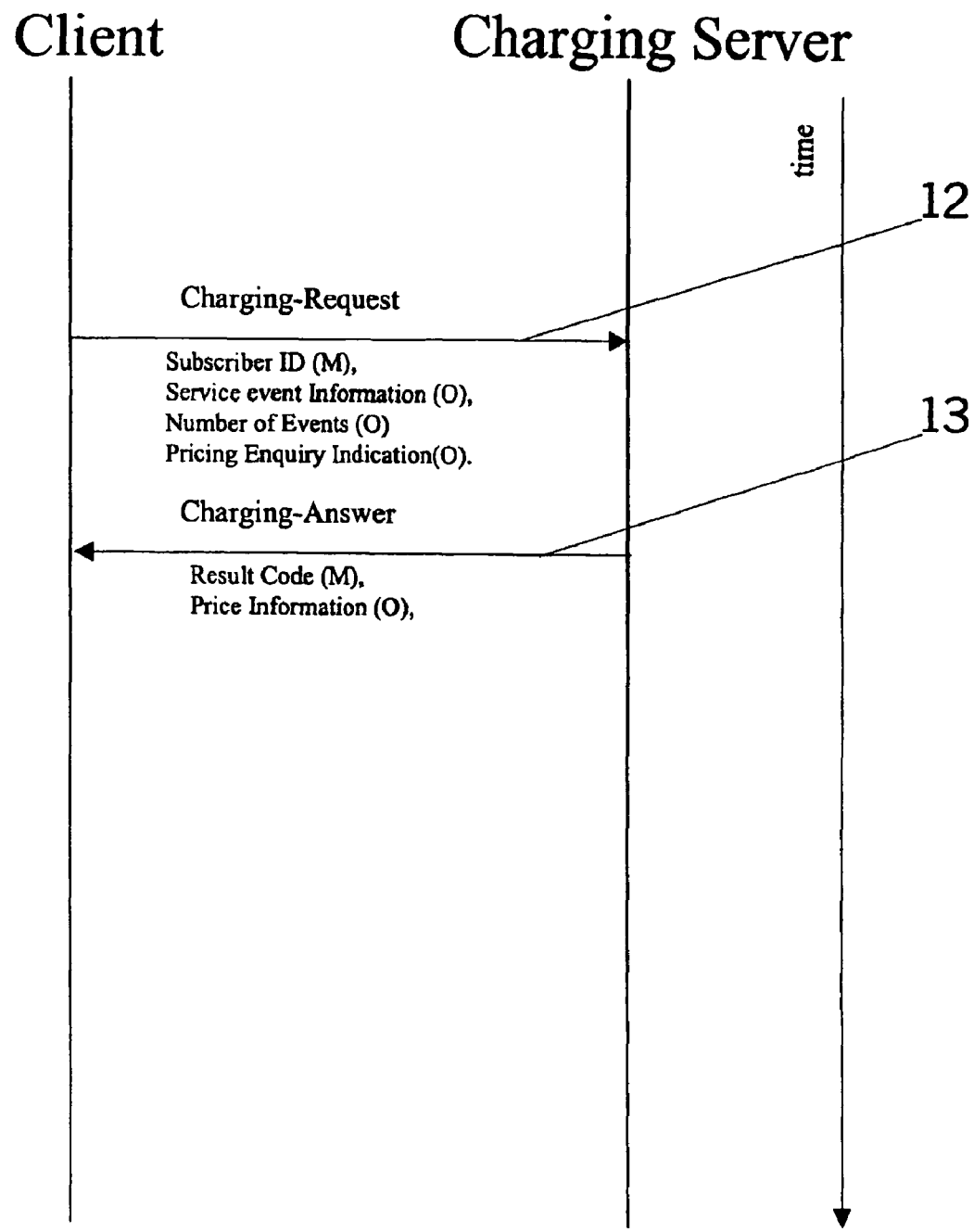
FIG. 4 illustrates the message sequence for cost estimation for charging in a communication network according to the present invention.

FIG. 4 illustrates the message sequence for cost estimation for charging in a communication network according to the present invention. The client 1 may inquire the price of the service event (Pricing Enquiry Indication) before service execution by sending a Charging-Request 12 message to the charging server 2.

By using service event information and number of requested information, the charging server 2 calculates the price of the requested service. The charging server 2 does not perform any account balance check nor account adjustment. The charging server 2 returns the calculated price indication in a Charging-Answer 13 message to the client 1. The client 1 can then advice subscriber the cost of the requested service.

Figure 5:
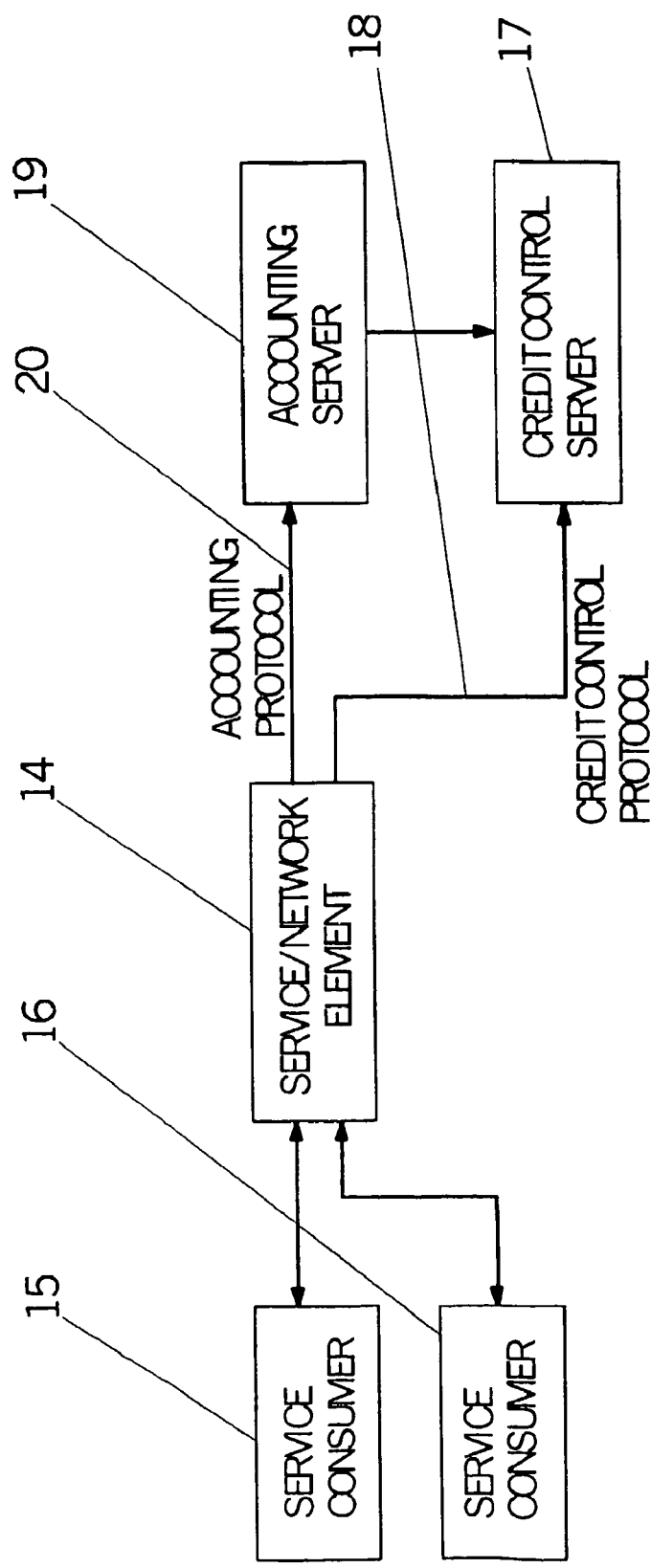
FIG. 5 illustrates a block diagram of the system for charging in a communication network according to the present invention.

FIG. 5 illustrates a block diagram of the system for charging in a communication network according to the present invention. In the charging system according to the present invention there is a Service/Network Element 14 and Service Consumers 15, 16. Service/Network Element 14 can be a Service Element 14 that provides Services to Service Consumers 15, 16 or a Network Element 14 that enables Service Consumers 15, 16 access to network usage.

In the charging system according to the present invention there is also a Credit Control Server 17. Before the service is provided, the Service/Network Element 14 contacts the Credit Control Server 17 using Credit Control Protocol 18 with Service Event information included (as described in the previous FIGS. 1-4). The Credit Control Server 17, depending on and defined by the Service Event information, performs the rating of the Service Event, pricing of the Service Event, credit check and pre-reservation.

In the charging system according to the present invention there is also an Accounting Server 19. The Accounting Server 19 is a server handling the accounting of the different events and services in the customer's network.

The Service/Network Element 14 can alternatively deliver the Service Event Information to the Accounting Server 19 using Accounting Protocol 20, which Accounting Server 19 may contact the Credit Control Server 17. The Credit Control Server 17 and the Accounting Server 19 are logical entities. An implemented configuration can contain both the Credit Control Server 17 and the Accounting Server 19 forming a single host or charging server.

When the Service Consumer 15, 16 requests a service the request is forwarded to a Service/Network Element 14 in home domain, that is the same administrative domain, in which the Service Consumer's 15, 16 Credit Control Server 17 is located.

Next the Service/Network Element 14 authorizes the Service Consumer 15, 16 and sends a request to the Credit Control Server 17. The Service/Network Element 14 can get the authorization information from an authorization server. The authorization server may also send the Service/Network Element 14 instructions and identification data regarding the Credit Control Protocol 18 and the Accounting Protocol 20.

The system for charging in a communication network according to the present invention has two main service scenarios:
 a one time event that is used for price enquiry and credit control, and
 several interrogations that are used for session based credit control.

The one time event is used when the Service/Network Element 14 wants to know the cost of the Service Event without any credit-reservation. It can be used also for a credit control when one time event has occurred in service environment. There might exist services offered by Application Service providers, whose prices are not known in the Service/Network Element. End User might also want to know the exact price of a Service Event before requesting the Service Event.

After a request 12 from the client the Credit Control Server 17 calculates the cost of the requested Service Event, but it does not perform any account balance check or credit-reservation from the account. The price of the requested Service Event is returned to the Service/Network Element 14 with the answer message 13.

There are certain one time events for which service execution is always successful in the service environment. In these cases Service/Network Element 14 can use the one time event scenario for real Credit Control. The Service/Network Element 14 sends a credit control request message 4, 8 to the Credit Control Server 17 before the Service/Network Element 14 allows the Service Event to the Service Consumer 15, 16.

The Credit Control Server 17 rates the Service Event and deduct the corresponding monetary amount from Service Consumer's 15, 16 account, and returns a credit control answer message 5, 9 to the Service/Network Element 14.

In a session based Credit Control there are several interrogations: the first, intermediate and the final interrogation. The Service/Network Element 14 sends a first interrogation message 4, 8 to the Credit Control Server 17 before the Service/Network Element 14 allows the Service Event to the Service Consumer 15, 16.

The Credit Control Server 17 rates the Service Event and deduct the corresponding monetary amount from Service Consumer's 15, 16 account, and returns a credit control answer message 5, 9 to the Service/Network Element 14. The type of the granted service units can be time, volume, event or money depending on the type of Service Event.

The Intermediate Interrogation can be sent as follows. When all the granted service units are spent by the Service Consumer 15, 16, the Service/Network Element 14 sends a new request 6, 10 to the Credit Control Server 17. The Credit Control Server 17 rates the Service Event and deduct the corresponding monetary amount from Service Consumer's 15, 16 account, and returns a credit control answer message 7, 11 to the Service/Network Element 14 as in the first interrogation. There can be several intermediate interrogations within one session.

When the Service Consumer 15, 16 finishes the Service Event or when all the granted units are used, the Service/Network Element 14 sends a Final Interrogation 6, 10 message to the Credit Control Server 17. After final interrogation the Credit Control Server 17 refunds the reserved credit amount not used to the Service Consumer's 15, 16 account, deducts the used monetary amount from the account and returns an answer message 7, 11.

The solution according to the present invention proposes a new protocol mechanism by which a client is able to charge certain amount of monetary units for particular event(s) occurring in the (com/service/multimedia) network under the control of the charging server. Monetary amount to be charged is determined by the client that sends a charging request to a server holding an account database. The server reserves the money from the account and allocates a duration during which the money is to be consumed or the server to be recontacted. Return message is sent back to the client. Upon subscriber having spent the reserved money, the client requests the server to withdraw the monetary amount from the account.

In the new protocol mechanism solution according to the present invention a client is able to request the Charging Server (server holding an account database) to rate particular service event(s) occurring in the (com/service/multimedia) network under the control of the client. The Server reserves the money according to the rating result from the account and allocates the number of the events and a duration during which the events are to be used or the server to be recontacted. Return message is sent back to the client. Upon subscriber having used the service events, the client requests the server to withdraw the monetary amount from the account.

In the new protocol mechanism solution according to the present invention a client is able to provide a mechanism to calculate the total cost of the service events(s) used during a particular service session according to the information provided the Charging Server. This solution addresses the possibility to return an estimate on the cost for the service event (s) before the service event(s) are executed, and final exact cost after the execution of the service event(s) for the served subscriber. This cost can be advised as a money.

The new protocol mechanism solution according to the present invention will improve the existing charging systems by enabling account debiting based on charges calculated by the interrogating network. The presented charging mechanism can be applied for instance to on-line charging of events occurring in Service Network and IP Multimedia Network. However, note that the solution is not restricted to those networks but the client can exist in any network.

The new protocol mechanism solution according to the present invention will also improve the existing charging systems by enabling service rating based on service event information received from Service Network or IP multimedia network or some other network. The new protocol mechanism solution according to the present invention will further improve the existing charging systems by enabling providing the cost estimation before service execution and final cost after service execution.

The present invention is further described in the Internet Engineering Task Force (IETF) contribution: "Diameter Credit Control Application".

Figure 6:
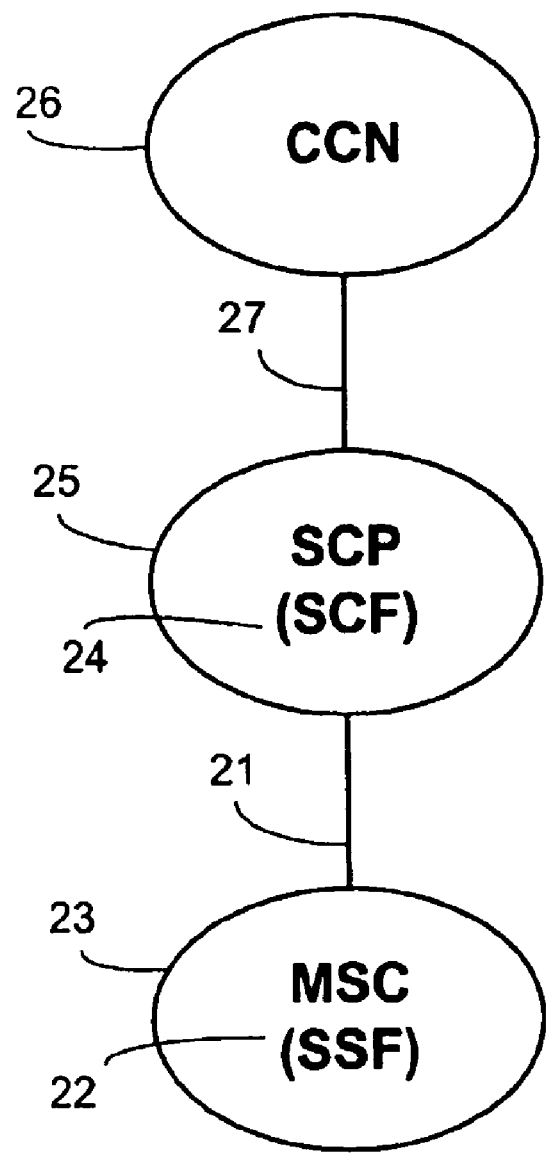
FIG. 6 illustrates another embodiment of the system in FIG. 1.

In another embodiment of the invention shown in FIG. 6 system includes an intelligent network IN with a signalling network, which performs message switching between network elements. In this embodiment of the invention, a specific type of signalling protocol, Camel Application Part (CAP) 21 for GSM/UMTS, is used as a carrier for the exchange of information messages and carries many types of information elements, which are useful for intelligent network services. However, CAMEL is only an example and the signalling protocol can be based on another protocol such as the Internet Protocol (IP), signalling system 7 (SS7), IN Application Part (INAP) for fixed networks—where CAP and INAP are transported on SS7/C7/SIGTRAN. Additionally, the intelligent network includes a service switching function (SSF) 22, which is usually located in the (G)MSC 23 in GSM systems. The SSF 22 detects events indicating a call requiring IN and after this triggering, it suspends call processing and starts a series of transactions with a service control function SCF 24. In this embodiment the SCF 24 is located at an SCP (Service Control Point) 25 handling an IN services, i.e clients 1, 14, such as Premium Rate calls, Mobile Virtual Private Network (VPN), Prepaid charging and Personal Number. In order to provide prepaid charging of IN services, the charging server is adapted to handle the on-line rating and charging. In this embodiment the charging server is a CCN (Charging Control Node) 22. Hence, an IN service of the SCP 25 sends charging data to the CCN 26 via another embodiment 27 of the on-line charging protocol according to the invention.

A charging request message from the SCP 25 to the CCN 26 includes an IN service parameter and an IN service information parameter. The IN service parameter identifies the IN service and the IN service information is used to differentiate between different usage of the same IN service, for example on-net and off-net calls in VPN.

Answer messages from the CCN 26 to the SCP 25 includes parameters as well, for handling the call control and end user communication connection, i.e the IN part of the prepaid service, in connection with account status received from the CCN 26. An account status parameter has different values to convey the status of the subscriber account to the SCP 25. In this embodiment the different values are active, supervised or barred. Active implies that the account can be charged; supervised implies that the account can be charged but there are warnings, for instance that the account will soon be barred, and barred implies that the account can not be charged.

Additionally, it is necessary for the IN service to be able to handle the call control and end user communication in connection with the amount available on the account, that it would receive from the CCN 26. An account value parameter has different values to convey the available amount of the subscriber account to the SCP 25.

In this embodiment the different values are large, medium or small. Theses values implies that the account has funds that will cover more than the normally assigned duration or volume, cover only the normally assigned duration or volume, or not cover the normally assigned duration or volume, respectively.

Figure 7:
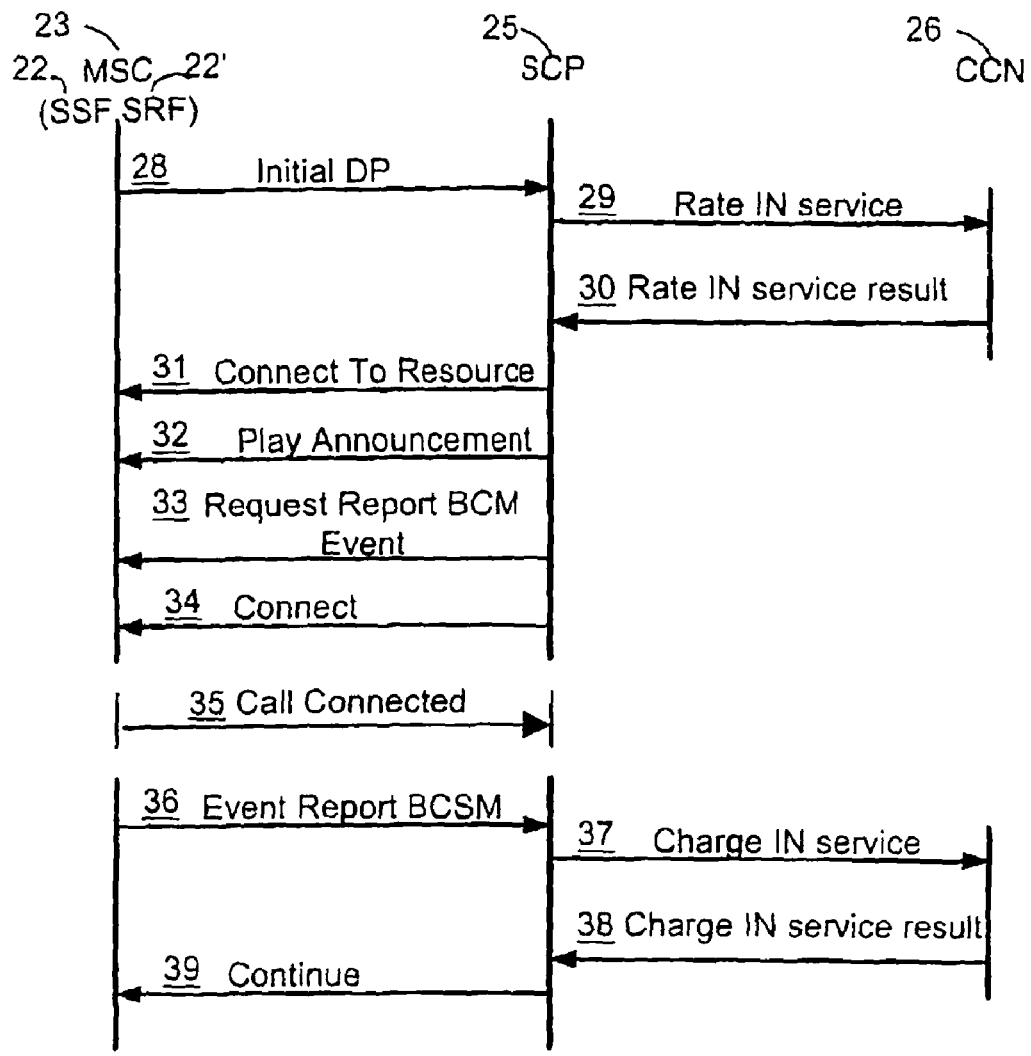
FIG. 7 illustrates the message sequence for account debiting in the system for charging in a communication network in FIG. 6.

FIG. 7 illustrates a message sequence for account debiting in the system for charging in the communication network in FIG. 6. When a VPN call is initiated from a subscriber the MSC 23 notices that IN should be invoked for the call and the SSF 22 sends an Initial DP to invoke the SCP 25 in step 28. The SCP 25 invokes the requested IN service, i.e VPN in this example, and sends a rating request to the CCN 26 in step 29. The CCN 26 checks the account and notice that the subscriber needs to be warned about a low account, and send the result back to the SCP 25 in step 30. In step 31, the SCP 25 checks the result and notices that the subscriber should be warned, wherein the SCP 25 instructs the SSF 22 to connect to an SRF (service rating function) 22'. Further, the SCP 25 instructs the SRF 22' to play an announcement to the subscriber in step 32. When the call is disconnected the SCP 25 requests a report from the SSF 22 in step 33. In the next step 34, the SCP 25 instructs the SSF 22 to connect the VPN call. The call is connected and proceeds in step 35. When the call is disconnected the SSF 22 informs the SCP 25 of the disconnection and replays to the requested report in step 36. The SCP 25 invokes the IN service and sends a charging request to the CCN 26 via the on-line charging protocol 27 in step 37. The CCN rates the call and charges the account, after which it sends the result back to the SCP 25 in step 38. The disconnection is continued when the SCP 25 instructs the SSF 22 to do so in step 39.

The invention claimed is:

1. A system for charging in a communications network, comprising:
a first service client for providing first Intelligent Network (IN) subscriber service to a subscriber wherein such first subscriber service doesn't have prepaid functionality;

a prepaid service system for providing prepaid subscriber service to said subscriber, further comprising
a charging server adapted to handle a subscriber account storing prepaid subscriber account information for said subscriber;
said first service client adapted to send a first-charging request message to the charging server before the first subscriber service is provided using an on-line charging protocol;
said charging server within said prepaid service system being adapted to reserve an amount of resources from the subscriber account, said amount depending on a requested amount included in said first charge request message, and to return an answer message to said first service client, including information indicating the amount of resources that has been reserved from said subscriber account for enabling usage of said first subscriber service by said subscriber.

2. The charging system according to claim 1, wherein the first service client is adapted to originate and send a second charging request message to the charging server using said on-line charging protocol, said second charging request message including the amount of resources used by the subscriber for said first subscriber service,
the charging server is adapted to deduct the amount of resources used by the subscriber from the subscriber account, and to return a second answer message to the first service client using said on-line charging protocol.

3. The charging system according to claim 1 wherein said first charging request message includes subscriber identification.

4. The charging system according to claim 3, wherein said first charging request message includes an allowed duration for consuming the reserved resources.

5. The charging system according to claim 1, wherein the first charging request message expresses the requested amount of resources as a monetary value, and that the charging answer message expresses the reserved monetary amount as a monetary value.

6. The charging system according to claim 1, wherein
the first charging request message expresses the requested amount as a number of service events,
the charging server is adapted to rate the service events, and
the charging answer message expresses the reserved monetary amount as a number of reserved service events.

7. The charging system according to claim 1, wherein
the first charging request message expresses the requested amount as a length of service time,
the charging server is adapted to rate the service events, and
the charging answer message expresses the reserved monetary amount as a length of reserved service time.

8. The charging system according to claim 1, wherein
the first charging request message expresses the requested amount as a volume of data for transfer,
the charging server is adapted to rate the service events, and
the charging answer message expresses the reserved monetary amount as a reserved volume of data for transfer.

9. The charging system according to claim 1, wherein the on-line charging protocol is based on Diameter protocol.

10. The charging system according to claim 1, wherein the on-line charging protocol is based on Parlay protocol.

11. The charging system according to claim 1, wherein the on-line charging protocol is based on SS7 protocol.

12. The charging system according to claim 1, wherein the first service client is an Intelligent network service and the on-line charging protocol is based on INAP CS1 protocol.

13. The charging system according to claim 12, wherein the IN service is a Premium Rate call, Mobile Virtual Private Network (VPN) call, or Personal Number service.

14. A system for charging in a communications network, comprising:
a first service client for providing first Intelligent Network (IN) subscriber service to a subscriber wherein such first subscriber service doesn't have prepaid functionality;
a prepaid service system for providing prepaid subscriber service to said subscriber, further comprising:
a charging server adapted to handle subscriber account information,
said first service client is adapted for originating and sending a first charging request message to the charging server before the first subscriber service is provided, using an on-line charging protocol, and
said charging server is adapted to rate the first subscriber service and return an answer message to the first service client using said on-line charging protocol, said answer message including the price indication of the requested service.

15. A method for charging in a communications network including an Intelligent Network (IN) service client for providing a first subscriber service to a subscriber and a prepaid service system for providing prepaid subscriber service to said subscriber, further including a charging server adapted to handle a subscriber account storing subscriber account information, comprising the steps of:
said IN service client originating and sending a first charging request message for said first subscriber service, wherein said IN service client doesn't have prepaid functionality, to the charging server before the service is provided, using an on-line charging protocol
said charging server within said prepaid service system reserving an amount of resources from the subscriber account, wherein said amount depends on a requested amount included in said first charging request message; and
returning an answer message including information indicating said amount of resources reserved from said subscriber account for enabling usage of said first subscriber service to by the IN service client for said subscriber.

16. The method according to claim 15, further comprising the steps of:
said IN service client sending a second charging request message to the charging server using said on-line charging protocol wherein said request message includes the amount of resources used by the subscriber,
the charging server deducting the amount of resources used by the subscriber from the subscriber account, and
returning an answer message to the IN service client using said on-line charging protocol wherein the answer message includes the accumulated amount of resources used for said service.

17. The method according to claim 15, wherein said first charging request message includes an allowed duration for consuming the reserved resources.

18. The method according to claim 15, wherein the charging request message expresses the requested amount as a monetary value, and the charging answer message expresses the reserved monetary amount as a monetary value.

19. The method according to claim 15, wherein the charging request message expresses the requested amount as a number of service events, and the charging answer message expresses the reserved monetary amount as a number of reserved service events.

20. The method according to claim 15, wherein the charging request message expresses the requested amount as a length of service time, and the charging answer message expresses the reserved monetary amount as a length of reserved service time.

21. The method according to claim 15, wherein the first charging request message expresses the requested amount as a volume of data for transfer, and the charging answer message expresses the reserved monetary amount as a reserved volume of data for transfer.

22. A method for charging in a communications network including an Intelligent Network (IN) service client for providing a first subscriber service to a subscriber associated with the network and a prepaid service system for providing prepaid subscriber service to said subscriber, further including a charging server adapted to handle a subscriber account storing subscriber account information, the method comprising the steps of:
    said IN service client originating and sending a first charging request message for said first subscriber service for said subscriber, wherein said IN service client doesn't have prepaid functionality, to the charging server before the first subscriber service is provided, using an on-line charging protocol,
    said charging server within said prepaid service system rating the first subscriber service and returning an answer message to the IN service client using said on-line charging protocol, wherein said answer message includes the price indication of the requested service.

23. The method according to claim 22, wherein the charging request message expresses a request for the price of a service event and that the charging answer message expresses only price indications of the requested service event.

24. The method according to claim 22, further comprising the step of the charging server deducting the account based on the reserved amount of resources.

25. The method according to claim 24, wherein the IN service client is a Premium Rate call, Mobile Virtual Private Network (VPN) call, or Personal Number service.

26. A method for charging service usage in a communications network, comprising the steps of:
    handling subscriber account information by a prepaid charging server,
    receiving a first charging request message for a first subscriber service for a subscriber, originating from an Intelligent Network (IN) service client, before the first subscriber service is provided, using an on-line charging protocol, wherein said first subscriber service doesn't have prepaid functionality,
    reserving an amount of resources from the subscriber account by said prepaid charging server, said amount depending on a requested amount included in said first charging request message about said first subscriber service, and
    returning an answer message including information indicating an amount of resources reserved from said subscriber account for enabling usage of said first subscriber service to the IN service client using said on-line charging protocol.

27. The method according to claim 26, further comprises the steps of:
    receiving a second charging request message from the IN service client using said on-line charging protocol, said second charging request message including the amount of resources used by the subscriber,
    deducting the amount of resources used by the subscriber from the subscriber account, and
    returning an answer message to the IN service client using said on-line charging protocol wherein the answer message includes the accumulated amount of resources used for the usage of said service.

28. The method according to claim 26, wherein said first charging request message includes subscriber identification and a value of the amount of resources requested.

29. The method according to claim 28, wherein said first charging request message includes the allowed duration for the consuming of the reserved resources.

30. The method according to claim 26, wherein the first charging request message expresses the requested amount of resources as a monetary value, and that the charging answer message expresses the reserved monetary amount as a monetary value.

31. The method according to claim 26, wherein
    the first charging request message expresses the requested amount as a number of service events, and further comprises the steps of:
    rating the service events, and
    determining the reserved monetary amount as a number of reserved service events.

32. The method according to claim 26, wherein
    the first charging request message expresses the requested amount as a length of service time, and further comprises the steps of:
    rating the service events, and
    determining the reserved monetary amount as a length of reserved service time.

33. The method according to claim 26, wherein
    the first charging request message expresses the requested amount as a volume of data for transfer, and further comprises the steps of:
    rating the service events, and
    determining the reserved monetary amount as a reserved volume of data for transfer.

34. The method according to claim 26, wherein the IN service client is a service or network element, the charging server is a credit control server, and the credit control server performs the credit check and the pre-reservation.

35. The method according to claim 34, wherein the credit control server performs the rating of the service.

36. The method according to claim 26, wherein the on-line charging protocol is based on Diameter protocol, Parlay protocol, ss7 protocol, or INAP CS1 protocol.

37. A method for providing charging service usage in a communications network, comprising the steps of:
    storing subscriber account information within by a prepaid server system,
    receiving a first charging request message for a subscriber service for a subscriber by said prepaid server system, the request message originating from an Intelligent Network (IN) service client for providing said subscriber service, before the subscriber service is provided, using an on-line charging protocol, wherein said subscriber service doesn't have prepaid functionality;
    rating the subscriber service and
    returning an answer message to the IN service client using an said on-line charging protocol said answer message including the price indications of the requested service.

38. The method according to claim 37, wherein the IN service client is a Premium Rate call, Mobile Virtual Private Network (VPN) call, or Personal Number service.

\* \* \* \* \*